US010158461B2

(12) United States Patent
Li et al.

(10) Patent No.: US 10,158,461 B2
(45) Date of Patent: Dec. 18, 2018

(54) UPLINK CONTROL INFORMATION TRANSMITTING METHOD AND APPARATUS

(71) Applicant: Samsung Electronics Co., Ltd., Suwon-si, Gyeonggi-do (KR)

(72) Inventors: Yingyang Li, Beijing (CN); Shichang Zhang, Beijing (CN); Yi Wang, Beijing (CN); Jingxing Fu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 166 days.

(21) Appl. No.: 15/155,638

(22) Filed: May 16, 2016

(65) Prior Publication Data

US 2016/0338041 A1 Nov. 17, 2016

(30) Foreign Application Priority Data

May 14, 2015 (CN) .......................... 2015 1 0246773

(51) Int. Cl.
*H04L 5/00* (2006.01)
*H04W 52/14* (2009.01)
(Continued)

(52) U.S. Cl.
CPC ............ *H04L 5/001* (2013.01); *H04L 1/1671* (2013.01); *H04L 1/1861* (2013.01);
(Continued)

(58) Field of Classification Search
CPC .. H04W 72/0413; H04W 52/143; H04L 5/14; H04L 5/0055; H04L 1/1812
See application file for complete search history.

(56) References Cited

U.S. PATENT DOCUMENTS

2013/0259011 A1* 10/2013 Nakashima ....... H04W 72/0473
370/336
2014/0233517 A1* 8/2014 Seo ....................... H04L 1/0041
370/329
(Continued)

FOREIGN PATENT DOCUMENTS

WO  2012-060630 A2   5/2012
WO  2013/191453 A1   12/2013
WO  2014/021631 A1   2/2014

OTHER PUBLICATIONS

LG Electronics, 'HARQ-ACK PUCCH transmission for Rel-13 CA', R1-151502, 3GPP TSG RAN WG1 Meeting #80bis, Belgrade, Serbia, Apr. 11, 2015.
(Continued)

*Primary Examiner* — Walter J Divito
*Assistant Examiner* — Anthony Luo
(74) *Attorney, Agent, or Firm* — Jefferson IP Law, LLP

(57) ABSTRACT

An uplink control information (UCI) transmitting method is provided. In this method, a user equipment (UE) receives a configuration signaling, determines a candidate physical uplink control channel (PUCCH) set corresponding to an acknowledgement (ACK)/negative acknowledgement (NACK) resource indication (ARI), receives a downlink grant signaling and downlink data corresponding to the downlink grant signaling, generates hybrid automatic repeat request ACK (HARQ-ACK) bits, performs processing for UCI bits including HARQ-ACK, determines the PUCCH used to transmit the UCI bits in the candidate PUCCH set according to an ARI in the downlink grant signaling, and transmits the UCI bits on the determined PUCCH. The present disclosure further provides an aperiodic channel state information (A-CSI) transmitting method. In this method, a UE receives an uplink grant signaling, determines whether an A-CSI report is triggered according to a CSI
(Continued)

request field in the uplink grant signaling, determines a CSI process to be updated after determining that the A-CSI report is triggered, and transmits A-CSI on an uplink component carrier (CC) carrying the A-CSI report.

8 Claims, 6 Drawing Sheets

(51) Int. Cl.
  *H04L 1/16* (2006.01)
  *H04L 1/18* (2006.01)
  *H04L 5/14* (2006.01)
  *H04W 52/54* (2009.01)

(52) U.S. Cl.
  CPC .......... *H04L 1/1864* (2013.01); *H04L 5/0016* (2013.01); *H04L 5/0055* (2013.01); *H04L 5/0087* (2013.01); *H04W 52/143* (2013.01); *H04L 5/14* (2013.01); *H04W 52/545* (2013.01)

(56) References Cited

U.S. PATENT DOCUMENTS

| | | | |
|---|---|---|---|
| 2015/0078225 A1 | 3/2015 | Yang et al. | |
| 2015/0156762 A1 | 6/2015 | Hwang et al. | |
| 2016/0192388 A1* | 6/2016 | Ekpenyong | H04W 72/1284 370/329 |
| 2016/0212649 A1* | 7/2016 | Chen | H04W 24/10 |
| 2017/0078072 A1* | 3/2017 | Kang | H04L 1/0026 |

OTHER PUBLICATIONS

Intel Corporation, 'Clarification on PUCCH Format 3 Resource Derivation for TDD UL/DL Configuration 5', R1-150231, 3GPP TSG RAN WG1 Meeting #80bis, Belgrade, Serbia, Feb. 18, 2015.

Nokia Networks, 'Dynamic adaptation of HARQ-ACK feedback size and PUCCH format', R1-151838, 3GPP TSG RAN WG1 Meeting #80bis, Belgrade, Serbia, Apr. 10, 2015.

Alcatel-Lucent et al., "PUCCH design for A/N feedbacks on PCell up to 32 carrier aggregation", 3GPP Draft, R1-151326, EPUCCH PCell Final, 3GPP TSG-RAN WG2 Meeting #80bis, Apr. 20-24, 2015, XP050934205, Belgrade, Serbia.

Texas Instruments, Multiplexing periodic CSI and HARQ-ACK on PUCCH Format 3, 3GPP TSG RAN WG1 #70, R1-123187, XP050661079, Qingdao, China, Aug. 13-17, 2012.

Catr, Consideration on enhancement to UL control signalling for up to 32 component carriers, 3GPP TSG RAN WG1 Meeting #80bis, R1-152043, XP050934892, Belgrade, Republic of Serbia, Apr. 20-24, 2015.

* cited by examiner

UPLINK CONTROL INFORMATION TRANSMITTING METHOD AND APPARATUS

CROSS-REFERENCE TO RELATED APPLICATION(S)

This application claims the benefit under 35 U.S.C. § 119(a) of a Chinese patent application filed on May. 14, 2015 in the Chinese Patent Office and assigned Serial number 201510246773.2, the entire disclosure of which is hereby incorporated by reference.

TECHNICAL FIELD

The present disclosure relates to wireless communication fields. More particularly, the present disclosure relates to an uplink control information (UCI) transmitting method and apparatus.

BACKGROUND

In a long term evolution (LTE) system, wide work bandwidth can be obtained by aggregation of multiple component carriers (CCs) to constitute a downlink and an uplink, i.e., a carrier aggregation (CA) technology, so as to support a high transmission rate. At present, various types of CA are supported, i.e., all aggregated cells are frequency division duplex (FDD) cells, all aggregated cells are time division duplex (TDD) cells TDD uplink configuration and TDD downlink configuration of which are same, all aggregated cells are TDD cells TDD uplink configuration and TDD downlink configuration of which are different, aggregation of FDD cells and TDD cells are also supported. And the TDD uplink configuration and TDD downlink configuration of the TDD cells may be semi-statically configured, or may be dynamically changed.

For a user equipment (UE), when a CA mode is configured, a cell is a primary cell (Pcell), and other cells are referred to as secondary cells (Scells). According to a LTE method, on the Pcell and the Scells, downlink data is transmitted based on a hybrid automatic repeat request (HARQ) mechanism. Accordingly, the UE needs to feed HARQ acknowledgment (HARQ-ACK) corresponding to multiple cells back. For a cell in a FDD system, the HARQ-ACK corresponding to data in a downlink subframe is transmitted in an uplink subframe. For a cell in a TDD system, when the number of downlink subframes is more than the number of uplink subframes in its frame structure, HARQ-ACK corresponding to data in multiple downlink subframes is transmitted in an uplink subframe, wherein the multiple downlink subframes are referred to as a bundling window corresponding to the uplink subframe. For example, a size of the bundling window in a LTE TDD cell may be 1, 2, 3, 4, or 9. According to a LTE method, HARQ-ACK corresponding to all configured cells is fed back in a physical uplink control channel (PUCCH) on the Pcell. In addition, periodic channel state information (P-CSI) of various cells is also mapped to the Pcell for transmission, and aperiodic CSI (A-CSI) of various cells is mapped to a physical uplink shared channel (PUSCH) for transmission.

According to a LTE method, a PUCCH format 3 is supported, and a basic idea of the PUCCH format 3 includes that multiple pieces of uplink control information (UCI) bits, e.g., HARQ-ACK bits, scheduling requests (SRs), and/or P-CSI from multiple configured cells, are jointed encoded, and are mapped to a physical channel for transmission. The PUCCH format 3 may support transmission of at most 22 bits.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide uplink control information (UCI) transmitting methods and apparatus, so as to support transmission of more than 22 UCI bits and to implement effective aperiodic channel state information (A-CSI) transmission.

In accordance with an aspect of the present disclosure, an UCI transmitting method is provided. The UCI transmitting method includes receiving, by a user equipment (UE), a configuration signaling, determining a candidate physical uplink control channel (PUCCH) set corresponding to an acknowledgement ACK)/negative acknowledgement (NACK) resource indication (ARI), receiving, by the UE, a downlink grant signaling and downlink data corresponding to the downlink grant signaling, generating hybrid automatic repeat request ACK (HARQ-ACK) bits, and performing, by the UE, processing for UCI bits including HARQ-ACK, determining the PUCCH used to transmit the UCI bits in the candidate PUCCH set according to an ARI in the downlink grant signaling, and transmitting the UCI bits on the determined PUCCH.

Preferably, when a PUCCH format X is used to transmit the UCI bits, the process of the UE performing the processing for the UCI bits and transmitting the UCI bits on the PUCCH comprises:

writing the UCI bits after performing encoding, rate matching (RM) and scrambling into a $(R_{mux} \times C_{mux})$ matrix, reading the UCI bits out column by column, mapping first $C_{mux,0}$ columns to a first time slot, mapping last $C_{mux,1}$ columns to a second time slot, respectively mapping the first $C_{mux,0}$ columns in the first time slot and the last $C_{mux,1}$ columns in the second time slot after performing orthogonal cover code (OCC) extension to single-carrier frequency-division multiple access (SCFDMA) symbols, wherein the number of columns of the $(R_{mux} \times C_{mux})$ matrix $C_{mux}$ is determined according to the number of the SCFDMA symbols and a length of OCC of the PUCCH format X, the number of rows $R_{mux}$ is determined according to the number of modulation symbols transmission of which is supported by the PUCCH format X and the number of physical bits allowed to be carried by each of the modulation symbols, wherein $C_{mux,0} + C_{mux,1} = C_{mux}$.

Preferably, when the UCI bits includes periodic CSI (P-CSI), the UCI bits including the P-CSI are transmitted on the PUCCH indicated by the ARI.

Preferably, the processing of determining the PUCCH according to the ARI comprises:

respectively mapping the ARI and additional control information after processed together to transmission power control (TPC) fields in downlink grant signalings except a TPC field still used for the power control in a downlink grant signaling on a primary cell (Pcell); determining the PUCCH according to the ARI mapped to the corresponding TPC field.

Preferably, the process of mapping the ARI and the additional control information comprises: mapping the ARI to TPC fields in first N successive downlink grant signalings transmitted by the base station except the downlink grant signaling including the TPC field still used for the power control on the Pcell, and mapping the additional control information to a TPC field in a remaining downlink grant signaling, wherein N is a integer more than or equal to 4.

Preferably, the process of mapping the additional control information to the TPC field in the remaining downlink grant signaling comprises:

using the TPC field in the remaining downlink grant signaling to carry the total number of currently-scheduled downlink grant signalings; or using the TPC field in the remaining downlink grant signaling to carry the total number of currently-scheduled transport blocks (TBs).

Preferably, the process of the total number of the currently-scheduled downlink grant signalings or the total number of the currently-scheduled TBs is counted in a time domain, in a frequency domain, or jointly in both the time domain and the frequency domain.

Preferably, the process of determining the PUCCH according to the ARI comprises:

determining the PUCCH according to the ARI, selecting a PUCCH format according to the number of the UCI bits; or determining a PUCCH format and the PUCCH currently used according to the ARI, wherein PUCCH formats corresponding to different PUCCHs in the candidate PUCCH set is same or different.

In accordance with another aspect of the present disclosure, an UCI transmitting apparatus is provided. The UCI transmitting apparatus includes a candidate PUCCH set determining module, to receive a configuration signaling, determine a candidate PUCCH set corresponding to an ARI, a HARQ-ACK bit generating module, to receive a downlink grant signaling and downlink data corresponding to the downlink grant signaling, generate HARQ-ACK bits, a UCI bit processing module, to perform processing for the UCI bits including HARQ-ACK, a PUCCH determining module, to determine the PUCCH used to transmit the UCI bits in the candidate PUCCH set according to an ARI in the downlink grant signaling, and a transmitting module, to transmit the UCI bits on the determined PUCCH.

In accordance with another aspect of the present disclosure, an A-CSI transmitting method is provided. The A-CSI transmitting method includes receiving, by a UE, an uplink grant signaling, determining, by the UE, whether an A-CSI report is triggered according to a CSI request field in the uplink grant signaling, and after determining that the A-CSI report is triggered, determining, by the UE, a CSI process to be updated, and transmitting A-CSI on an uplink component carrier (CC) carrying the A-CSI report.

Preferably, the process of determining whether the A-CSI report is triggered according to the CSI request field in the uplink grant signaling comprises: for a CC only configured with downlink transmission, determining, by the UE, whether the A-CSI report is triggered by detecting a downlink control information (DCI) format 0, wherein the CSI request field in the DCI format 0 is used to trigger the A-CSI report of the CC only configured with the downlink transmission.

Preferably, for the CC only configured with the downlink transmission, when it is determined that the A-CSI report is triggered according to the DCI format 0, the uplink CC carrying the A-CSI report is a Pcell, a primary secondary cell (PScell) or an uplink CC indicated by designated bits in the DCI format 0.

Preferably, for the CC only configured with the downlink transmission, a CSI process triggered by each value of the CSI request field in the DCI format 0 is independently configured by a high layer signaling; and/or more than 2 bit information in the DCI format 0 is used as the CSI request field; and/or the process of transmitting the A-CSI on the uplink CC carrying the A-CSI report comprises: when uplink data transmission is not scheduled for the UE on the uplink CC carrying the A-CSI report, determining a physical uplink shared channel (PUSCH) parameter of the uplink CC according to the DCI format 0, and transmitting the A-CSI; when the uplink data transmission is scheduled for the UE on the uplink CC and another A-CSI report is not triggered, determining the PUSCH parameter of the uplink CC according to the uplink grant signaling of the uplink CC, and transmitting the A-CSI; when the UE detects the uplink grant signaling on the uplink CC and the uplink grant signaling triggers another A-CSI, only transmitting, by the UE, the A-CSI triggered by the uplink grant signaling, or simultaneously feeding, by the UE, two A-CSI reports back.

Preferably, the process of determining the CSI process to be updated comprises:

when the A-CSI of multiple cell groups (CGs) are triggered in a subframe and the total number of triggered CSI processes N is more than a UE capability of updating and reporting the A-CSI K, selecting K CSI processes with highest K priorities from the N CSI processes, updating and reporting the K CSI processes.

Preferably, a way of determining priorities of different CSI processes comprises:

a priority of the CSI process of simultaneously feeding rank indicator (RI) and channel quality information (CQI)/precoding matrix indicator (PMI) back is higher than a priority of the CSI process of only feeding the CQI/PMI back when default RI is used; and/or the priorities of the CSI processes are determined according to priorities of various pre-defined CSI report modes used for the A-CSI; and/or the priorities of the CSI processes are determined according to priorities of various pre-defined downlink transmission modes; and/or the priorities of the CSI processes are determined according to CSI process identifications (IDs); and/or a unique cell ID is configured for each CC configured for the UE, the priorities of the CSI processes are determined according to cell IDs; and/or a cell ID is configured for each CC configured for the UE, the cell ID is a cell index in a CG, and the priorities of the CSI processes are determined according to cell IDs; and/or the priorities of the CSI processes are determined according to CG indices; and/or when a CG is divided to multiple A-CSI subsets of feeding the A-CSI back, the priorities of the CSI processes are determined according to A-CSI subset indices; and/or the priorities of the CSI processes are determined according to whether cells carry UCI, wherein a priority of a Pcell is higher than a priority of a PScell, the priority of the PScell is higher than a priority of another Scell; and/or a priority of the CSI process of a cell in a licensed spectrum is higher than a priority of the CSI process of a cell in an unlicensed spectrum, or the priority of the CSI process of the cell in the unlicensed spectrum is higher than the priority of the CSI process of the cell in the licensed spectrum.

Preferably, when the K CSI processes with the K highest priorities are selected, for an A-CSI report corresponding to a CG, only the CSI of CSI processes in the K CSI processes with the highest K priorities is remained, and the total number of the A-CSI bits are determined according to the remained CSI.

In accordance with another aspect of the present disclosure, an A-CSI transmitting apparatus is provided. The A-CSI transmitting apparatus includes a receiving module, to receive an uplink grant signaling, an A-CSI report triggering module, to determine whether an A-CSI report is triggered according to a CSI request field in the uplink grant signaling, and a transmitting module, to after determining the A-CSI report is triggered, determine a CSI process to be updated, and transmit A-CSI on an uplink CC carrying the A-CSI report.

It can be seen from the technical solutions above that, in this present disclosure, a UE receives a configuration signaling, determines a candidate PUCCH set corresponding to an ARI, receives a downlink grant signaling and downlink data corresponding to the downlink grant signaling, generates HARQ-ACK bits, performs processing for UCI bits including HARQ-ACK, determines the PUCCH used to transmit the UCI bits in the candidate PUCCH set according to an ARI in the downlink grant signaling, and transmits the UCI bits on the determined PUCCH. Thus, transmission of more than 22 UCI bits can be transmitted.

The present disclosure further provides an A-CSI transmitting method. In this method, a UE receives an uplink grant signaling, determines whether an A-CSI report is triggered according to a CSI request field in the uplink grant signaling, determines a CSI process to be updated after determining that the A-CSI report is triggered, and transmits A-CSI on an uplink CC carrying the A-CSI report. Thus, effective A-CSI transmission can be implemented.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
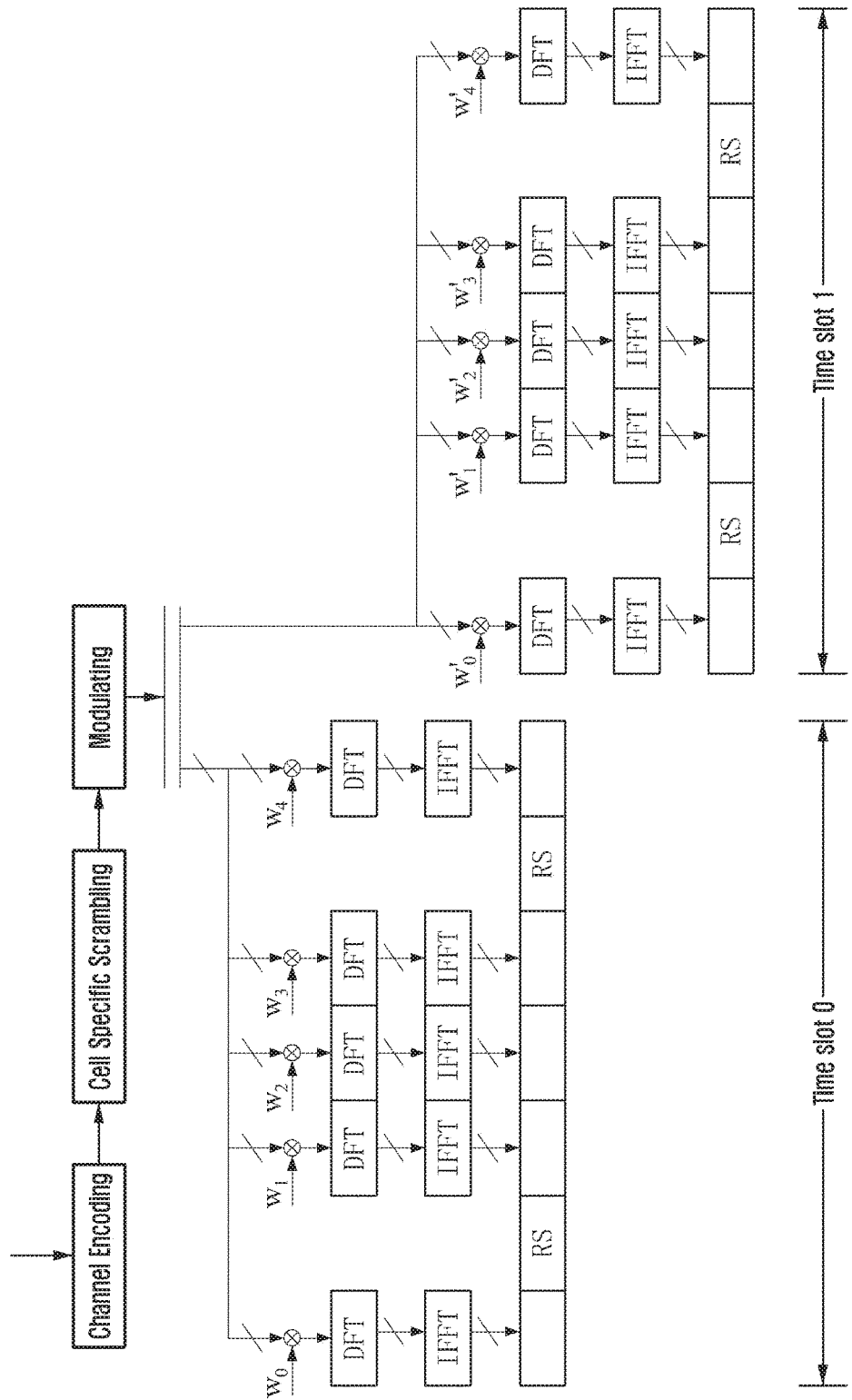
FIG. 1 is a schematic diagram illustrating a physical uplink control channel (PUCCH) format 3 according to an embodiment of the present disclosure.

FIG. 1 is a schematic diagram illustrating a physical uplink control channel (PUCCH) format 3 according to an embodiment of the present disclosure.

Referring to FIG. 1, it is assumed that rate matching (RM) encoding is used, the UCI bits after performing the RM channel encoding and the scrambling are modulated to obtain 24 quadrature phase-shift keying (QPSK) symbols, and the 24 QPSK symbols are mapped to a physical resource block (PRB) in uplink resources for transmission. First 12 QPSK symbols are mapped to a first time slot for the PUCCH format 3 for transmission, and last 12 QPSK symbols are mapped to a second time slot for the PUCCH format 3 for transmission. There is a mirroring relation relative to a center frequency between locations of PRBs respectively used for the PUCCH format 3 transmission in two slots, so as to obtain a frequency diversity gain. Take the first time slot as an example. The 12 QPSK symbols after respectively multiplying by each element of an orthogonal cover code (OCC) are mapped to five symbols in the first time slot, wherein the length of the OCC is equal to 5.

At present, 3rd generation partnership project (3GPP) organization for standardization performs standard works for an enhanced CA technology of aggregating more cells, e.g., the number of the aggregated cells can reach 32. For a UE, all configured cells may be divided into multiple cell groups (CGs), or there is one CG. For each CG, the UCI is fed back in a PUCCH on a cell, wherein the cell on which the UCI is fed back is similar as the Pcell in the current CA technology. The number of cells in each CG may exceed the maximum number of aggregated cells supported by the current CA technology. When the number of the configured cells is large or the size of the bundling window is large, the number of the HARQ-ACK bits to be fed back by the UE is large, e.g., the number of the HARQ-ACK bits is more than 22. In addition, when the number of the configured cells is large, the CSI to be fed back by the UE is increased accordingly. In addition, the UE may transmit a SR in the uplink. For example, the number of CSI bits is more than 22. Accordingly, in order to support transmission of more than 22 UCI bits, a new PUCCH format is required. Thus, a PUCCH format X is introduced, which will bring a series of effects, and a UCI transmitting method will be designed accordingly.

An uplink control information (UCI) transmitting method is provided according to various embodiments of the present disclosure.

Figure 2:
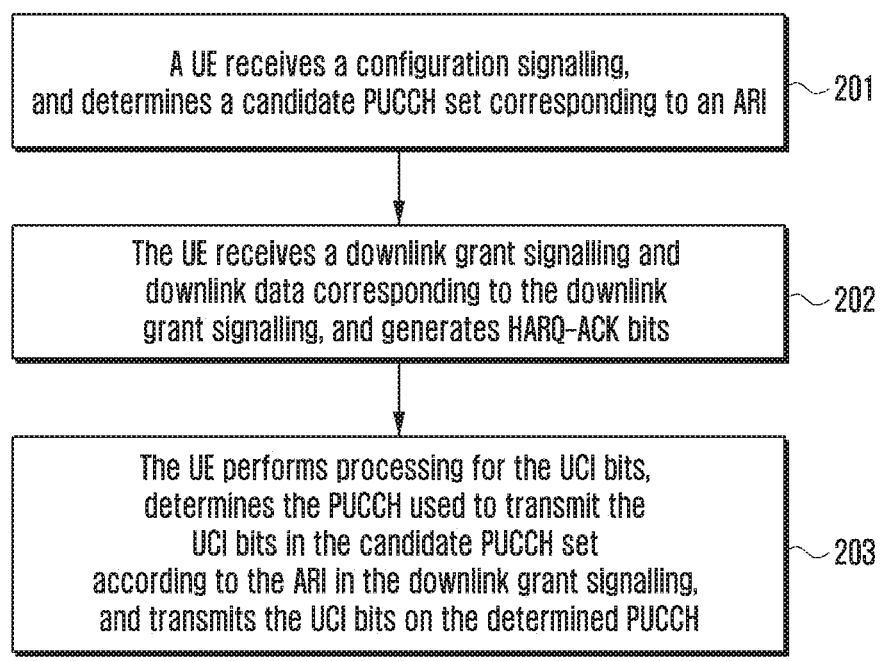
FIG. 2 is a flowchart illustrating a uplink control information (UCI) transmitting method according to various embodiments of the present disclosure.

FIG. 2 is a flowchart illustrating a UCI transmitting method according to various embodiments of the present disclosure.

Referring to FIG. 2, the method includes procedures as follows.

At operation 201, a user equipment (UE) receives a configuration signaling, and determines a candidate physical uplink control channel (PUCCH) set corresponding to an acknowledgement (ACK)/negative acknowledgement (NACK) resource indication (ARI).

In particular, the candidate PUCCH set is semi-statically configured through a signaling such as a radio resource control (RRC) signaling, and the candidate PUCCH set corresponds to the ARI. When hybrid automatic repeat request ACK (HARQ-ACK) is to be fed back in a subframe, a PUCCH used to transmit the HARQ-ACK and additional information in UCI may be dynamically indicated by the 2-bit ARI in a downlink grant signaling in the candidate PUCCH set.

At operation 202, the UE receives a downlink grant signaling and downlink data corresponding to the downlink grant signaling, and generates HARQ-ACK bits.

The downlink grant signaling received by the UE includes the ARI used to indicate the PUCCH.

At operation 203, the UE performs processing for the UCI bits including the HARQ-ACK, determines the PUCCH used to transmit the UCI bits in the candidate PUCCH set according to the ARI in the downlink grant signaling, and transmits the UCI bits on the determined PUCCH.

Various embodiments of the present disclosure are described as follows.

First Embodiment

In a carrier aggregation (CA) system, a PUCCH format 3 supports transmission of at most 22 UCI bits. In order to feed more UCI bits back on a PUCCH, a new PUCCH format is defined, which is referred to as a PUCCH format X hereinafter. In this embodiment, a UCI transmitting method by using the PUCCH format X is described, i.e., a method for implementing procedures in block 203 when the PUCCH format X is used in FIG. 2.

The PUCCH format X may be obtained by extending the PUCCH format 3. A possible method includes ensuring that an orthogonal cover code (OCC) extension structure of the PUCCH format 3 is not changed (i.e., a length of the OCC is not changed), and increasing the number of physical resource blocks (PRBs) used in a frequency domain to support more UCI bits. For example, it is assumed that the PUCCH format X may use N PRBs, thus, may carry about 22N UCI bits. Another extending method includes ensuring that one PRB is used in the frequency domain, and decreasing the length of the OCC. For example, a 2-bit OCC is used to support more UCI bits. Alternatively, the number of the used PRBs is increased, and the length of the OCC is decreased, so as to support more UCI bits. According to any of the three methods above, after encoding, rate matching (RM), scrambling and modulating are respectively performed for the UCI bits, modulation symbols are mapped to uplink single-carrier frequency-division multiple access (SCFDMA) symbols after OCC extension is performed for the modulation symbols.

Figure 3:
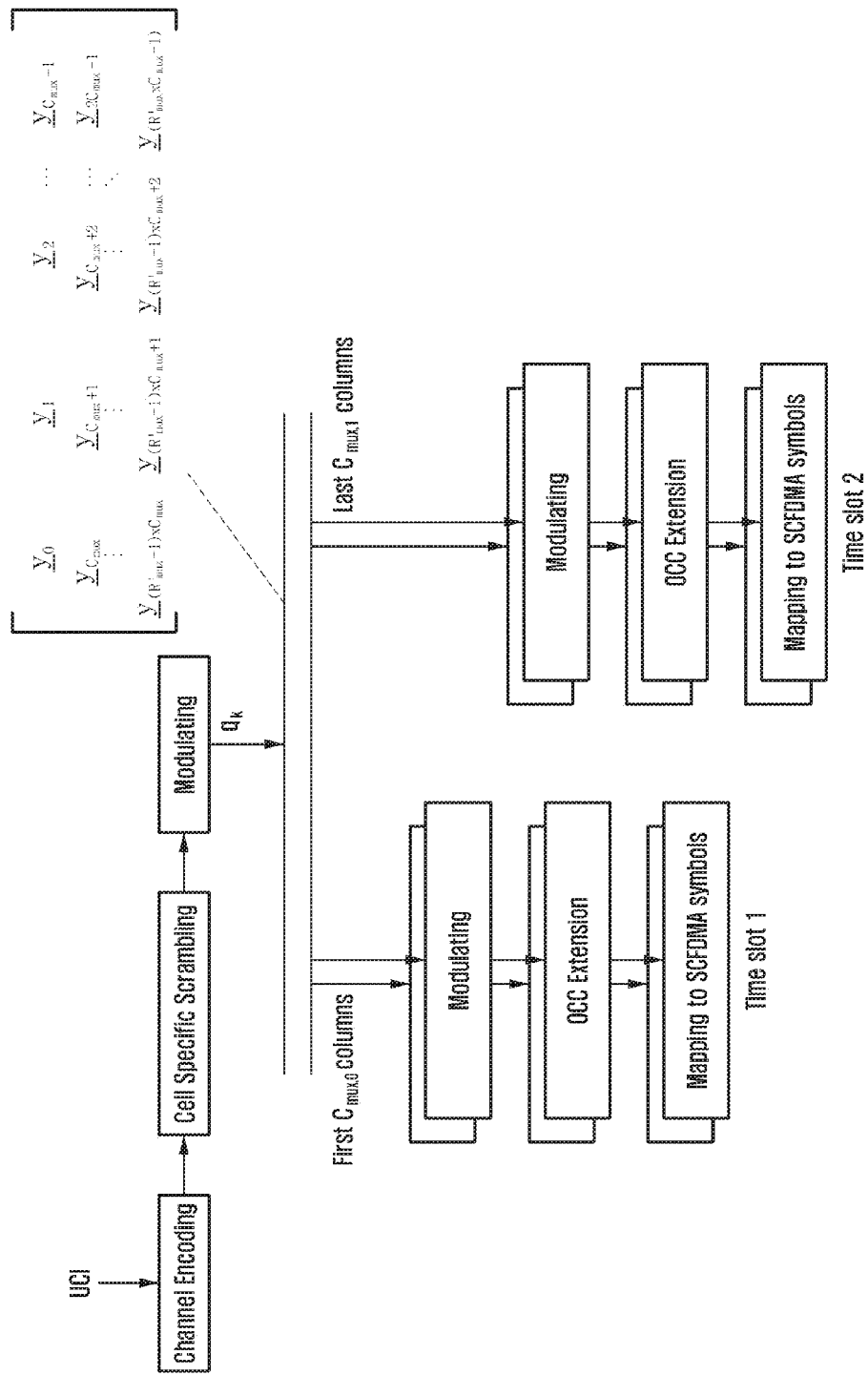
FIG. 3 is a schematic diagram illustrating a PUCCH format X according to an embodiment of the present disclosure.

FIG. 3 is a schematic diagram illustrating a PUCCH format X according to an embodiment of the present disclosure.

Referring to FIG. 3, it is assumed that, the UCI bits after performing the encoding, the rate matching and the scrambling are equally divided into $C_{mux}$ parts represented as $C_{mux}$ columns. $C_{mux,0}$ columns after performing the modulating and the OCC extension are mapped to uplink SCFDMA symbols in a first time slot, and $C_{mux,1}$ columns after performing the modulating and the OCC extension are mapped to uplink SCFDMA symbols in a second time slot, wherein $C_{mux,0}+C_{mux,1}=C_{mux}$. $C_{mux,0}$ may be equal to $C_{mux,1}$, or may differ by 1 to $C_{mux,1}$, so as to maximize the frequency diversity gain. It may be assumed that the length of the OCC is equal to the number of the SCFDMA symbols used to carry the modulation symbols in a time slot, thus, $C_{mux,0}=C_{mux,1}=1$. It may be assumed that the length of the OCC is less than the number of the SCFDMA symbols used to carry the modulation symbols in a time slot, thus, $C_{mux,0}$ and $C_{mux,1}$ may be respectively more than 1. In FIG. 3, a process of performing the encoding, the rating matching and the scrambling for a piece of UCI is illustrated, which may represent a process of performing joint encoding for some pieces of different types of UCI; or it may be supported through a simple extension that the encoding, the rate matching and the scrambling may be respectively performed for the pieces of the multiple types of UCI, and then the pieces of the multiple types of UCI are mapped as the $C_{mux}$ columns. In FIG. 3, the process of dividing the UCI bits into the $C_{mux}$ columns may be performed before a modulating module is performed, or may be performed after the modulating module is performed.

Based on a PUCCH structure in long term evaluation (LTE), there is a mirroring relation relative to a center frequency between locations of PRBs respectively used for the PUCCH format X transmission in two slots in a subframe. Thus, the frequency diversity gain may be obtained for a signal transmitted in the two slots. For a signal in a time slot, since the signal is limited in a time slot, there is no frequency diversity effect. Further, the UCI is denoted as $c_k$, wherein k is the number of the UCI bits, k=0, 1, . . . , K-1. According to a convolutional encoding method in LTE, output bits respectively corresponding to three generator polynomials are $d_k^{(0)}$, $d_k^{(1)}$ and $d_k^{(2)}$. According to a rating matching method in LTE, the bit sequences $d_k^{(0)}$, $d_k^{(1)}$ and $d_k^{(2)}$ are respectively interleaved, and are cascaded to obtain a cyclic buffer sequence for the rating matching process. In particular, first K bits of the cyclic buffer sequence correspond to $d_k^{(0)}$, middle K bits of the cyclic buffer sequence correspond to $d_k^{(1)}$, and last K bits of the cyclic buffer sequence correspond to $d_k^{(2)}$. Thus, the output bits after performing the RM operation may maintain a similar structure, i.e., successive K bits correspond to one of $d_k^{(0)}$, $d_k^{(1)}$ and $d_k^{(2)}$. In order to ensure that the similar frequency diversity gain is obtained for the K bits corresponding to each generator polynomial (i.e., $d_k^{(0)}$, $d_k^{(1)}$ or $d_k^{(2)}$), the K bits may be evenly mapped to resources in two time slots. According to a structure of the PUCCH format X as shown in FIG. 3, a processing method includes writing a bit sequence $q_k$ after performing the scrambling into a ($R_{mux}$×

$C_{mux}$) matrix, reading the bit sequence out column by column, mapping the first $C_{mux,0}$ columns to a first time slot, mapping the last $C_{mux,1}$ columns to a second time slot, mapping the first $C_{mux,0}$ columns in the first time slot after performing the OCC extension to SCFDMA symbols, and mapping the last $C_{mux,1}$ columns in the second time slot to SCFDMA symbols after performing the OCC extension. The number of columns of the ($R_{mux} \times C_{mux}$) matrix $C_{mux}$ may be obtained according to the number of the SCFDMA symbols and the length of the OCC of the PUCCH format X. The number of modulation symbols transmission of which is supported by the PUCCH format X is denoted as H. Each modulation symbol may carry $Q_m$ physical bits. For the number of rows of the ($R_{mux} \times C_{mux}$) matrix $R_{mux}$, $R_{mux}$= $(H \cdot Q_m)/C_{mux}$, and it is denoted that $R'_{mux}=R_{mux}/Q_m$. In FIG. 3, only $R'_{mux}$ rows are illustrated, and each element $y_k$ actually represents a column vector including $Q_m$ rows. It may be assumed that $q_k$ is written into the ($R_{mux} \times C_{mux}$) matrix row by row, thus, $y_k$=[$q_{p0}$, $q_{p0+C_{mux}}$ ... $q_{p0+C_{mux} \cdot (Q_m-1)}]^T$, and $p_0 = Q_m \cdot C_{mux} \cdot \lfloor k/C_{mux} \rfloor + k \mod C_{mux}$. Alternatively, it may be assumed that $q_k$ is written into the ($R_{mux} \times C_{mux}$) matrix group by group, wherein a group includes $Q_m$ rows, thus, $$\underline{y}_k = [q_{Q_m \cdot k}, q_{Q_m \cdot k+1} \cdots q_{Q_m \cdot k+Q_m-1}]^T.$$

According to this method, it is ensured that K bits corresponding to each generator polynomial (i.e., $d_k^{(0)}$, $d_k^{(1)}$ or $d_k^{(2)}$) are evenly mapped to the first $C_{mux,0}$ columns and the last $C_{mux,1}$ columns, and then are mapped in two time slots of the PUCCH format X transmission, so as to obtain the similar frequency diversity gain and to improve link performance of the PUCCH format X transmission.

Second Embodiment

In this embodiment, when UCI bits include both HARQ-ACK and periodic channel state information (P-CSI), i.e., the HARQ-ACK and the P-CSI are simultaneously transmitted, a processing method is described as follows.

In the LTE system, if multiple types of signals are to be transmitted in an uplink subframe by the UE, multiples corresponding uplink channels are allocated for the UE. For example, when the P-CSI is to be transmitted in a subframe, the base station semi-statically configures a channel used for P-CSI transmission for the UE. When the number of the P-CSI bits is less than or equal to M (e.g., M is equal to 11), a PUCCH format 2 is still used to fed the P-CSI back. When the number of the P-CSI bits is large, the PUCCH format X is used for the P-CSI transmission. Alternatively, when the total number of the P-CSI bits is less than or equal to N (e.g., N is equal to 22), the PUCCH format 3 is used for the P-CSI transmission; and when the total number of the P-CSI bits is more than N, the PUCCH format X is used.

In addition, when the HARQ-ACK is fed back in a subframe, the 2-bit ARI in a downlink grant signaling may dynamically indicate a PUCCH used for the transmission of the HARQ-ACK and additional information in the UCI. In particular, four candidate PUCCHs may be semi-statically configured through the RRC signaling, so that the 2-bit ARI may dynamically indicate which PUCCH is used for the UCI transmission. The PUCCH format 3 may be used for UCI transmission in the PUCCH, so as to support transmission of at most 22 UCI bits. Alternatively, the PUCCH format X may be used for transmission of more than 22 UCI bits in the PUCCH.

Based on analysis above, the base station may be in accordance with the total number of the P-CSI bits to semi-statically configure the PUCCH used for the P-CSI transmission, thus, the PUCCH used for the P-CSI transmission may carry a few bits. The base station may be in accordance with the UCI bits fed back in a cell group (CG) in a subframe (including the HARQ-ACK and the P-CSI, and further including scheduling request (SR)) to determine the PUCCH indicated by the ARI, thus, the PUCCH indicated by the ARI may carry more bits. Thus, when the P-CSI and the HARQ-ACK are simultaneously fed back in a subframe, the PUCCH allocated for the P-CSI transmission may not carry all UCI bits (including the HARQ-ACK and the P-CSI, and further including SR), but the PUCCH indicated by the ARI may carry all the UCI bits.

In order to ensure UE operation consistency in conditions of various combinations of feedback information in the UCI, according to some embodiments of the present disclosure, when the P-CSI and the HARQ-ACK are simultaneously transmitted in a subframe (the SR may further simultaneously transmitted), the UE may feed the UCI back in the PUCCH dynamically indicated by the ARI.

According to this method above, the UE operation includes feeding the UCI back by using the PUCCH indicated by the ARI, regardless of which PUCCH format (the PUCCH format 2, the PUCCH format 3, or the PUCCH format X) is used in the PUCCH semi-statically configured for the P-CSI transmission. Thus, the UE operation consistency is ensured. When the PUCCH indicated by the ARI does not exist, the PUCCH semi-statically configured for the P-CSI transmission may be used to feed the uplink information back. In addition, when the PUCCH format used in the channel configured for the P-CSI transmission is same as that used in the channel indicated by the ARI, since multiple values are set for the ARI, the base station may dynamically adjust PUCCH allocation according to a UE scheduling condition, so as to improve PUCCH allocation flexibility of the base station. According to base station's implementation, the PUCCH semi-statically configured for the P-CSI transmission may be one of candidate PUCCHs corresponding to the N-bit ARI and semi-statically configured, e.g., N is equal to 2. Thus, the base station can flexibly select the PUCCH used for the UCI transmission through the ARI, so as to avoid additional PUCCH expenses.

Third Embodiment

In order to decrease redundant bits of ARI and to improve resource utilization, a new ARI carrying method is provided according to some embodiments of the present disclosure. According to the new ARI carrying method, the UE extracts the ARI from a corresponding downlink grant signaling to determine a PUCCH used for transmission of UCI bits. According to the new ARI carrying method, the UE may further effectively identify a condition of losing last some successive downlink grant signalings in a bundling window.

In the LTE system, the HARQ-ACK corresponding to downlink transmission in multiple downlink subframes on multiple component carriers (CCs) may be fed back in an uplink subframe. The multiple downlink subframes on the multiple CCs are referred to as a bundling window corresponding to the uplink subframe. In order to assist the UE to determine whether one or more pieces of downlink transmission have been lost, a downlink allocation indication (DAI) technology is introduced in the LTE system. In particular, the DAI may be 2-bit information, which is a counter used to indicate how many downlink grant signalings are transmitted to a current subframe location. However, a condition of losing four successive downlink grant signalings or a condition of losing last some successive downlink grant signalings may not be found according to the 2-bit DAI. The 2-bit DAI is a trade-off between detection performance and signaling overhead. That is, in the LTE system, a probability of losing four successive downlink subframes is very low, thus, optimization is not needed.

In addition, in the LTE system, when the HARQ-ACK is to be fed back in a subframe, the 2-bit ARI in the downlink grant signaling may dynamically indicate a PUCCH used for HARQ-ACK transmission. Four candidate PUCCHs may be semi-statically configured through a RRC signaling, so that the 2-bit ARI may dynamically indicate which PUCCH is used for the HARQ-ACK transmission.

According to methods in the current LTE system, a transmission power control (TPC) field in the downlink grant signaling the DAI of which is equal to 1 on the primary cell (Pcell) is still used for the power control. A TPC field in another downlink grant signaling on the Pcell and a TPC field in a downlink grant signaling on a secondary cell (Scell) are used for the ARI. When at most 32 carriers are configured for the UE, especially in a time division duplex (TDD) system, many TPC fields in downlink grant signalings are used for the ARI. But all pieces of the ARI carried in the TPC fields are same 2-bit information, which cause a great amount of redundant bits.

According to some embodiments of the present disclosure, the ARI and additional control information (e.g., newly-defined control information) after processed together are mapped to TPC fields in downlink grant signalings except the TPC field still used for the power control in the downlink grant signaling on the Pcell. The additional control information may indicate which PUCCH format is currently allocated for the channel, the total number of transmitted downlink grant signalings and the total number of transmitted transport blocks (TBs); or the additional control information may be as extension information of the DAI. When the UE receives a number of downlink grant signalings except the downlink grant signaling including the TPC field used for the power control on the Pcell, the UE may recover the ARI information and the additional condition information.

According to analysis above, the condition of losing successive four downlink grant signalings may not be found according to the DAI currently designed in the LTE system. That is, optimization for this condition of losing four successive downlink grant signalings is not needed. Thus, the TPC field in the downlink grant signaling may be used to carry more information. The DAI may be still used in a time domain, i.e., the DAI is used to count the number of downlink grant signalings in various subframes on a CC. Alternatively, the DAI may be used in a frequency domain, i.e., the DAI is used to count the number of downlink grant signalings on various CCs in a same subframe. Alternatively, the DAI may be used in both the time domain and the frequency domain, i.e., the DAI is firstly used to count the number of downlink grant signalings on various CCs in a subframe, and then is used to count the number of downlink grant signalings on various CCs in a next subframe. Alternatively, the DAI may be used in the frequency domain, i.e., the DAI is used to continue to count the number of TBs scheduled by downlink grant signalings on various CCs in a same subframe. Alternatively, the DAI may be used in both the time domain and the frequency domain, i.e., the DAI is firstly used to count the number of TBs scheduled by downlink grant signalings on various CCs in a subframe, and then is used to continue to count the number of TBs scheduled by downlink grant signalings on various CCs in a next subframe.

According to a possible method, TPC fields in first N successive downlink grant signalings transmitted by the base station except the TPC field used for the power control in the downlink grant signaling on the Pcell may still indicate the ARI, wherein N is more than $N_{min}$, e.g., $N_{min}$ is equal to 4; and a TPC field in subsequent another downlink grant signaling is used to indicate the additional control information. When the UE loses the first N successive downlink grant signalings except the downlink grant signaling including the TPC field used for the power control on the Pcell, there is no available ARI information for the UE. The probability of losing the first N successive downlink grant signalings is extremely low, thus, optimization is not needed. A method for processing TPC fields in downlink grant signalings after an N-th downlink grant signaling indicating the ARI is described as follows.

In a first processing method, these TPC fields are used to carry the total number of the downlink grant signalings currently scheduled by the based station. Further, $\log_2(N_{min})$ bits are used for transmission by the number of the downlink grant signalings mod $N_{min}$. For example, when $N_{min}$ is equal to 4, the total number of the currently-scheduled downlink grant signalings is transmitted by using 2 bits. According to the DAI used for counting in the downlink grant signaling, the UE may find a condition of losing successive less than $N_{min}$ downlink grant signalings except a condition of losing last some downlink grant signalings. Further, based on this method, according to the total number of the downlink grant signalings carried in the TPC field, the UE may determine whether last $1 \sim N_{min}-1$ downlink grant signalings are lost. Thus, according to the DAI and the total number of the downlink grant signalings carried in the TPC fields, the UE may find all conditions of losing less than $N_{min}$ successive downlink grant signalings. According to the analysis above, if optimization for losing $N_{min}$ successive downlink grant signalings when $N_{min}$ is more than or equal to 4 is not needed, the UE may estimate how many downlink grant signalings are transmitted from the base station, and may configure the number of the HARQ-ACK bits. The UE may further determine which PUCCH format is used in the channel indicated by the ARI according to the UCI bits carried in the current subframe. The UCI may include the HARQ-ACK, the P-CSI and/or the SR.

According to this method, it may be assumed that the UE receives at least one downlink grant signaling except the downlink grant signaling including the TPC field used for the power control on the Pcell and the first N downlink grant signalings indicating the ARI. That is, the UE receives the number of the currently-scheduled downlink grant signalings carried in TPC fields. Thus, the UE may accurately obtain the total number of the HARQ-ACK bits transmitted on the PUCCH, and may transmit the HARQ-ACK on the PUCCH indicated by the ARI according to the total number of the HARQ-ACK bits. The additional information in the UCI may be simultaneously fed back in the PUCCH indicated by ARI. Alternatively, it may be assumed that the UE only receives at least one of the first N downlink grant signalings indicating the ARI except downlink grant signaling including the TPC field used for the power control on the Pcell, thus, the UE may still obtain the ARI to determine the PUCCH, but may not accurately determine the number of the downlink grant signalings scheduled by the base station. In this condition, in order to determine the total number of the HARQ-ACK bits, the UE may obtain the number of the downlink grant signalings through detection or analysis, or may assume that the base station fixedly schedules N downlink grant signalings to calculate the number of the HARQ-ACK bits, e.g., the UE fixedly feeds 2N HARQ-ACK bits back.

If the base station actually schedules at least $N+N_{min}$ downlink grant signalings, it is ensured that the UE receives the total number of the currently-scheduled downlink grant signalings carried in the TPC field under a prerequisite that the condition of successively losing $N_{min}$ downlink grant signalings is not optimized. Thus, the base station may assume that the UE accurately knows the total number the HARQ-ACK bits, so that blind detection is not needed. If the base station actually schedules more than N but less than $N+N_{min}$ downlink grant signalings, the UE may at most lose last $N_{min}-1$ downlink grant signalings, which may cause that the UE may not receive the total number of the currently-scheduled downlink grant signalings carried in the TPC field, thus, the UE may not know the accurate number of the HARQ-ACK bits. Alternatively, if the base station actually schedules less than or equal to N downlink grant signalings, i.e., the base station may not use the TPC field to carry the total number of the currently-scheduled downlink grant signalings, the UE may not know the accurate number of the HARQ-ACK bits. If the UE determines the total number of the HARQ-ACK bits according to the number of the downlink grant signalings obtained through detection or analysis, the base station may receive the HARQ-ACK by blindly detecting multiple possible total numbers of the HARQ-ACK bits, or may receive the HARQ-ACK according to the number of the HARQ-ACK bits corresponding to actually-scheduled downlink transmission data. Alternatively, in the condition of not receiving the number of the currently-scheduled downlink grant signalings, the UE may calculate the number of the HARQ-ACK bits based on assumption that the base station fixedly schedules N downlink grant signalings, e.g., the UE fixedly feeds 2N-bit HARQ-ACK back. The base station may blindly detect two payload sizes, i.e., the number of the HARQ-ACK bits corresponding to the actually-scheduled downlink transmission data and the 2N bits.

In a second processing method, these TPC fields are used to carry the total number of TBs currently scheduled by the base station. Further, $\log_2(B_{min})$ bits may be used for transmission by the total number of TBs mod $B_{min}$. For example, $B_{min}$ is equal to 8, the $\log_2(B_{min})$-bit information after processed is mapped to TPC fields in multiple downlink grant signalings. According to the DAI used for counting the TBs in the downlink grant signaling, the UE may find a condition of losing successive less than $B_{min}$ TBs except a condition of losing last some TBs. Further, based on this method, the UE may determine whether last $1 \sim B_{min}-1$ TBs scheduled by the base station are lost according to the total number of the TBs in the TPC fields. Thus, according to the DAI and the total number of the TBs carried in the TPC fields, the UE may find all conditions of losing less than $B_{min}$ successive TBs. According to the analysis above, if optimization for losing $B_{min}$ successive TBs when $B_{min}$ is more than or equal to 8 (i.e., losing more than 4 downlink grant signalings) is not needed, the UE may estimate how many TBs are transmitted from the base station, and may configure the number of the HARQ-ACK bits. The UE may further determine which PUCCH format is used in the channel indicated by the ARI according to the UCI bits carried in the current subframe. The UCI may include the HARQ-ACK, the P-CSI and/or the SR.

According to this method, it may be assumed that the UE receives at least one downlink grant signaling except the downlink grant signaling including the TPC field used for the power control on the Pcell and the first N downlink grant signalings indicating the ARI. That is, the UE receives the total number of the currently-scheduled TBs carried in the TPC fields. Thus, the UE may accurately obtain the total number of the HARQ-ACK bits transmitted on the PUCCH, and may transmit the HARQ-ACK on the PUCCH indicated by the ARI according to the total number of the HARQ-ACK bits. The additional information in the UCI may be simultaneously fed back in the PUCCH indicated by ARI. Alternatively, it may be assumed that the UE only receives at least one of the first N downlink grant signalings indicating the ARI except downlink grant signaling including the TPC field used for the power control on the Pcell, thus, the UE may still obtain the ARI to determine the PUCCH, but may not accurately determine the number of the TBs scheduled by the base station. In this condition, in order to determine the total number of the HARQ-ACK bits, the UE may obtain the number of the TBs through detection or analysis, or may assume that the base station fixedly schedules B TBs to calculate the number of the HARQ-ACK bits, e.g., the UE fixedly feeds B HARQ-ACK bits back.

If the base station actually schedules at least $N+N_{min}$ downlink grant signalings, it is ensured that the UE receives the total number of the currently-scheduled TBs carried in the TPC field under a prerequisite that the condition of successively losing $N_{min}$ downlink grant signalings is not optimized. Thus, the base station may assume that the UE accurately knows the total number the HARQ-ACK bits, so that blind detection is not needed. If the base station actually schedules more than N but less than $N+N_{min}$ downlink grant signalings, the UE may at most lose last $N_{min}-1$ downlink grant signalings, which may cause that the UE may not receive the total number of the currently-scheduled TBs carried in the TPC field, thus, the UE may not know the accurate number of the HARQ-ACK bits. Alternatively, if the base station actually schedules less than or equal to N downlink grant signalings, i.e., the base station may not use the TPC field to carry the total number of the currently-scheduled TBs, the UE may not know the accurate number of the HARQ-ACK bits. If the UE determines the total number of the HARQ-ACK bits according to the number of the TBs obtained through detection or analysis, the base station may receive the HARQ-ACK by blindly detecting multiple possible total numbers of the HARQ-ACK bits, or may receive the HARQ-ACK according to the number of the HARQ-ACK bits corresponding to actually-scheduled downlink transmission data. Alternatively, in the condition of not receiving the number of the currently-scheduled TBs, the UE may calculate the number of the HARQ-ACK bits based on assumption that the base station fixedly schedules B TBs, e.g., the UE fixedly feeds B-bit HARQ-ACK back. The base station may blindly detect two payload sizes, i.e., the number of the HARQ-ACK bits corresponding to the actually-scheduled downlink transmission data and the B bits.

Fourth Embodiment

In this embodiment of the present disclosure, a method for determining a PUCCH and a corresponding PUCCH format according to ARI is described as follows.

In the LTE system, HARQ-ACK corresponding to downlink transmission on multiple CCs in multiple downlink subframes is fed back in an uplink subframe. The multiple downlink subframes of the multiple CCs are referred to as a bundling window corresponding to the uplink subframe. If frequency division duplex (FDD) timing is used as reference HARQ timing, the bundling window includes resources on multiple CCs in a subframe. If TDD timing is used as the reference HARQ timing, the bundling window includes resources on multiple CCs in multiple subframes. The more the number of CCs configured for the UE, the more the number of the HARQ-ACK bits. For example, it is assumed that 32 CCs are configured, the bundling window corresponding to each CC includes 4 subframes, thus, the number of the HARQ-ACK bits may reach 128 even in a spatial bundling condition.

In a normal condition, the base station may not schedule all subframes of all configured CCs in the bundling window for a same UE. In a condition, the base station may schedule a little downlink data in the bundling window, and the valid number of the HARQ-ACK bits is less than or equal to N1 bits, e.g., N1 is equal to 22. Considering resource utilization rate, the PUCCH format 3 may be configured for the UE. In another condition, the base station may schedule many downlink data, and the valid number of the HARQ-ACK bits is more than N1. The PUCCH format X may be configured for the UE. The PUCCH format X may further support multiple numbers of payload bits. For example, when the number of the HARQ-ACK bits to be fed back is more than N1 and less than N2 (e.g., N2 is equal to 66), the UE may process the PUCCH format X according to a condition of carrying N2 bits; when the number of the HARQ-ACK bits to be fed back is more than N2, the UE may process the PUCCH format X according to a condition of carrying N3 bits (e.g., N3 is equal to 130). In order to optimize PUCCH transmission performance and improve uplink resource utilization rate under a prerequisite of ensuring scheduling flexibility of the base station, the UE may dynamically change the used PUCCH format. For example, the PUCCH format 3 and the PUCCH format X may be changed between each other according to a threshold N1 bits; or the PUCCH format 3, the PUCCH format X for a small payload, and the PUCCH format X for a large payload may be changed between each other according to thresholds N1 bits and N2 bits.

In addition, in the LTE system, when the HARQ-ACK is to be fed back in a subframe, 2-bit ARI in the downlink grant signaling may dynamically indicate a PUCCH used for the HARQ-ACK transmission. Four candidate PUCCHs may be configured through a RRC signaling, so as to use 2-bit ARI to dynamically indicate which PUCCH is used for the HARQ-ACK transmission.

According to various embodiments of the present disclosure, a value of the ARI may dynamically indicate the PUCCH format used for UCI transmission, and may further indicate the PUCCH currently used by the UE. In particular, the ARI is denoted as N-bit information, e.g., N is equal to 2. $2^N$ candidate options are semi-statically configured through the RRC signaling, wherein a candidate option includes a PUCCH format and a corresponding PUCCH. PUCCH formats corresponding to different PUCCHs in the candidate options may be same or may be different. N-bit ARI in the downlink grant signaling may dynamically indicate the PUCCH format and the PUCCH used for the UCI transmission. The UE may determine the PUCCH format and the PUCCH used for the UCI transmission according to the detected ARI. According to this method, the base station can flexibly and dynamically indicate the PUCCH format. However, if the number of the ARI bits is not increased, the number of candidate PUCCHs corresponding to a designated PUCCH format is decreased.

According to various embodiments of the present disclosure, the UCI transmitting method is implemented as described above. Further, a UCI transmitting apparatus is provided according to various embodiments of the present disclosure.

Figure 4:
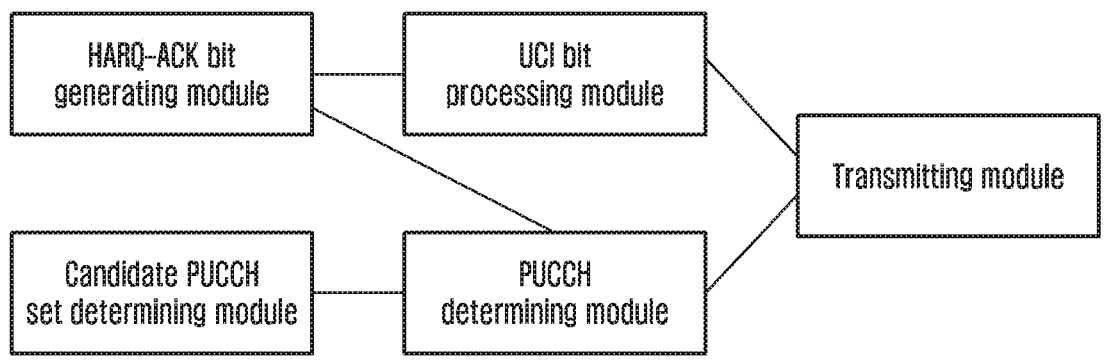
FIG. 4 is a schematic diagram illustrating a structure of a UCI transmitting apparatus according to various embodiments of the present disclosure.

FIG. 4 is a schematic diagram illustrating a basic structure of the apparatus according to various embodiments of the present disclosure.

Referring to FIG. 4, the apparatus includes a candidate PUCCH set determining module, a HARQ-ACK bit generating module, a UCI bit processing module, a PUCCH determining module in a processor, and a transmitting module in a transceiver.

The candidate PUCCH set determining module is to receive a configuration signaling, and determine a candidate PUCCH set corresponding to an ARI. The HARQ-ACK bit generating module is to receive the downlink grant signaling and downlink data corresponding to the downlink grant signaling, and generate HARQ-ACK bits. The UCI bit processing module is to perform processing for the UCI bits including the HARQ-ACK. The PUCCH determining module is to determine the PUCCH used to transmit the UCI bits in the candidate PUCCH set according to the ARI in the downlink grant signaling. The transmitting module is to transmit the UCI bits on the determined PUCCH.

A method and apparatus for transmitting aperiodic CSI (A-CSI) in UCI are described as follows.

Figure 5:
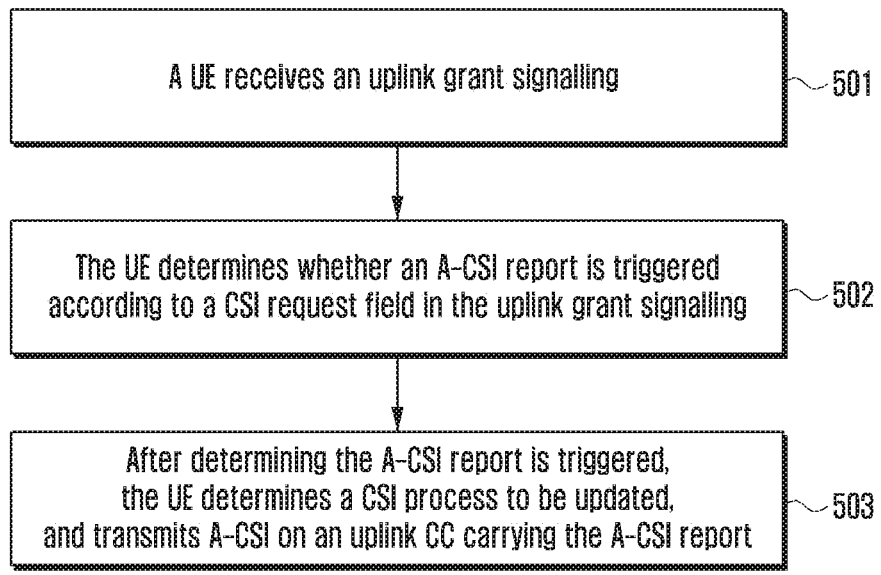
FIG. 5 is a basic flowchart illustrating an aperiodic channel state information (A-CSI) transmitting method according to various embodiments of the present disclosure.

FIG. 5 is a flowchart illustrating an A-CSI transmitting method according to various embodiments of the present disclosure.

Referring to FIG. 5, this method includes procedures as follows.

At operation 501, a UE receives an uplink grant signaling.

At operation 502, the UE determines whether an A-CSI report is triggered according to a CSI request field in the uplink grant signaling.

At operation 503, after determining the A-CSI report is triggered, the UE determines a CSI process to be updated, and transmits A-CSI on an uplink CC carrying the A-CSI report.

The A-CSI transmitting method is described according to two embodiments of the present disclosure as follows.

Fifth Embodiment

In the LTE system, an A-CSI report is triggered, and is mapped to a PUSCH for transmission. The uplink grant signaling may include a 1-bit or 2-bit CSI request field, the CSI request field is used to trigger an A-CSI report for the UE. Take the 2-bit CSI request field as an example. A value "0,0" indicates not to trigger the A-CSI report. A value "0,1" indicates the A-CSI report of the downlink CC corresponding to the uplink CC scheduled by the uplink grant signaling, wherein a corresponding relationship between the downlink CC and the uplink CC is determined according to a system information block 2 (SIB2). Which CSI reports are respectively indicated through values "1,0" and "1,1" are determined by a RRC signaling, i.e., the values "1,0" or "1,1" may be configured to trigger an A-CSI report of any of CCs, so as to ensure a maximum flexibility. For the value "0,1", since typical CA configuration is asymmetric, only the downlink CC configured with the corresponding uplink CC can use the value "1,0" to trigger the A-CSI report. Especially, since the UE may be configured with 32 downlink CCs and only 1 uplink CC, a probability of the use of the value "1, 0" is limited.

According to various embodiments of the present disclosure, in order to fully use the value "0,1", the UE is required to detect downlink control information (DCI) format 0 on the CC only configured with the downlink transmission, so that the DCI format 0 is used to trigger the A-CSI report of the CC only configured with the downlink transmission for the UE. The number of blind detection times is not increased when the UE detects the DCI format 0. That is because that the number of bits of the DCI format 0 is equal to that of the DCI format 1A, and the UE has to detect the DCI format 1A when blindly detecting the downlink grant signaling used for scheduling the downlink transmission.

Since the uplink transmission may not be performed on the CC only configured with the downlink transmission, the triggered A-CSI may only be transmitted on another CC configured with uplink bandwidth. The another CC may fixedly be a Pcell; or the another CC may be the CC used to feed the UCI of the CC only configured with the downlink transmission back, i.e., the primary secondary cell (PScell); or some bits of the DCI format 0 is re-defined, so as to indicate the UE to select the another CC used to feed the A-CSI back from multiple configured uplink CCs.

The DCI format 0 corresponding to the CC only configured with the downlink transmission may be used only to trigger the A-CSI, or may be used simultaneously to trigger the A-CSI of the CC only configured with the downlink transmission and to schedule uplink data transmission on the CC on which the A-CSI is fed back.

For the DCI format 0 corresponding to the CC only configured with the downlink transmission, only the value "0,1" may be used to trigger the A-CSI, or values "0,1", "1,0" and "1,1" may also be used to trigger the A-CSI. For the values "0,1", "1,0" and "1,1", CSI processes corresponding to the A-CSI triggered through the values "0,1", "1,0" and "1,1" may be configured through a higher signaling, which may be same with or different from configuration of another CC supporting the uplink transmission.

The DCI format 0 corresponding to the CC only configured with the downlink transmission may have 2 bits used for the CSI request, or may have more bits used for the CSI request. Thus, the RRC signaling may be used to configure more different A-CSI sets. For example, it is assumed that the DCI format 0 corresponding to the CC only configured with the downlink transmission is not used to schedule uplink data, thus, some fields in the DCI format are invalid, and may be used to increase bits of the CSI request.

When the A-CSI is triggered through the DCI format 0 corresponding to the CC only configured with the downlink transmission and uplink data transmission is not scheduled for the UE on the CC on which the A-CSI is fed back, a related PUSCH parameter of the CC on which the A-CSI is fed back is determined according to the DCI format 0, and the A-CSI is transmitted. When the A-CSI is triggered through the DCI format 0 corresponding to the CC only configured with the downlink transmission, the uplink data transmission is scheduled for the UE on the CC on which the A-CSI is fed back, but an additional A-CSI report is not triggered on the CC on which the A-CSI is fed back, the related PUSCH parameter is determined according to the uplink grant signaling of the CC on which the A-CSI is fed back, and the A-CSI triggered through the DCI format 0 of the CC only configured with the downlink transmission is transmitted in the PUSCH. When the A-CSI is triggered through the DCI format 0 of the CC only configured with the downlink transmission and the UE detects the uplink grant signaling of the CC on which the A-CSI is fed back which triggers the additional A-CSI (i.e., the UE simultaneously receives at least two A-CSI triggers in a subframe), the UE determines this condition as a configuration error; or the UE may only feed the A-CSI triggered by the uplink grant signaling of the CC on which the A-CSI is fed back, i.e., the UE discard the A-CSI triggered by the DCI-format 0 corresponding to the CC only configured with the downlink transmission; or the UE may simultaneously feed the two A-CSI reports back, especially, the UE may feed a union set of the two A-CSI reports, i.e., the CSI processes repeatedly for the two A-CSI reports are only transmitted once.

Sixth Embodiment

In the LTE system, an A-CSI report is triggered, and is mapped to a PUSCH for transmission. The uplink grant signaling may include a 1-bit or 2-bit CSI request field, the CSI request field is used to trigger an A-CSI report for the UE. Take the 2-bit CSI request field as an example. A value "0,0" indicates not to trigger the A-CSI report. A value "0,1" indicates the A-CSI report of the downlink CC corresponding to the uplink CC scheduled by the uplink grant signaling, wherein a corresponding relationship between the downlink CC and the uplink CC is determined according to a SIB2. Which CSI reports are respectively indicated through values "1,0" and "1,1" are determined by a RRC signaling, i.e., the values "1,0" or "1,1" may be configured to trigger an A-CSI report of any of CCs, so as to ensure a maximum flexibility.

In addition, in the LTE system, multiple CGs may be configured for the UE. For a CG, UCI of various cells in the CG is fed back on a cell in the CG. Especially, the RRC signaling is used to configure a set of CSI processes of A-CSI reports for each CG, and the uplink grant signalings are used respectively to trigger the A-CSI reports of the UE. However, according to UE capability, regardless whether multiple CGs are configured, the number of CSI processes of A-CSI updated and fed back in a subframe is fixed, which is denoted as K CSI processes. For various CGs, the A-CSI reports triggered by CSI request fields are independently configured, i.e., for a CG, it is allowed that a code word corresponding to the CSI request field is used to configure A-CSI reports corresponding to at most the K CSI processes. Thus, when the base station triggers the A-CSI reports in the multiple CGs in a same subframe, the total number of CSI processes triggered in the multiple CGs may exceed UE capability of updating the feeding the A-CSI back. In a processing method, the UE may take this condition as a configuration error, which may cause an A-CSI trigger limitation of the base station. In another processing method, it may depend on UE implementation to process this condition. Since different manufacturers may have different implementing methods, the base station may not determine which K CSI processes are updated and reported by the UE. Thus, it is hard for UE scheduling. Actually, in some conditions, the base station may intentionally make the number of the A-CSI processes triggered in the multiple CGs in a subframe more than K. A priority rule may be defined to control the UE only to update A-CSI of a part of CGs, wherein the part of the CGs have high priorities, or to control UE only to update CSI processes of various CGs, wherein the CSI processes have high priorities. Thus, the CSI process set updated is not configured through the RRC signaling, so that to increase the number of sets including the triggered A-CSI in a condition of not changing the RRC signaling.

According to this embodiment, when the base station triggers the A-CSI corresponding to multiple CGs and the total number of the triggered CSI processes is more than the UE capability of updating and reporting the A-CSI K, the total number of the triggered CSI processes is denoted as N, the UE respectively selects CSI processes with highest K priorities from the N CSI processes, updates and reports the CSI.

For the CSI, the priority may be processed according to aspects as follows.

For the A-CSI, a design rule may include feeding completed CSI once, i.e., reporting whole related channel quality information (CQI)/precoding matrix indicator (PMI) when rank indicator (RI) is a designated value in default (e.g., RI is equal to 1), or reporting the RI and whole CQI/PMI in a PUSCH. Thus, a method for distinguishing between two CSI report types (i.e., the RI and the CQI/PMI) may not directly apply to the A-CSI. In a simple method, the CSI report type is not used as a rule of the A-CSI priority. Alternatively, a priority of the CSI process of simultaneously feeding the RI and the CQI/PMI back is higher than a priority of the CSI process of only feeding the CQI/PMI back when the default value of RI is used. Alternatively, priorities of various CSI report modes used for the A-CSI may be defined. Alternatively, priorities of various downlink transmission modes may be defined.

A CSI process ID may still use as a rule of determining an A-CSI priority. For example, the CSI process with a small CSI process ID is prioritized. CSI processes for TM1~TM9 is not defined in the LTE system, but may be processed by only configuring a CSI process the CSI process ID of which is equal to 0.

There are two methods for defining a cell ID. In a first method, a unique cell ID is configured for each CC configured for the UE. Thus, the priorities of the CSI processes of different CGs may be determined according to cell IDs. Since different CGs have different cell IDs, it is ensured that a CSI process with a highest priority may be selected. Thus, it is not used to compare another parameter. In a second method, the cell ID is configured as a cell index of a cell in the CG, i.e., cells in different CGs may have a same cell ID used for the A-CSI priority. Thus, when the cell IDs of the CSI processes in two CGs are same, CSI subframe set indices may be further compared, e.g., the CSI process with a small CSI subframe set index is prioritized; or when the cell IDs of the CSI processes in the two CGs are same, the CG indices may be further compared, e.g., the CSI process with a small CG index is prioritized; or both the CSI subframe set index and the CG index may be used in the priority rule.

The CG index may be taken as a rule of determining the A-CSI priority. For example, the CSI process with the small CG index is prioritized. According to this method, it can be implemented that the CG including the Pcell has the highest priority, so as to ensure downlink transmission performance of the CG including the Pcell.

It is assumed that a CG may be further divided into multiple A-CSI subsets of feeding A-CSI back, i.e., the A-CSI triggered by the A-CSI report is limited on a subset of CCs in the CG. Thus, the index of the A-CSI subset is considered as a rule of determining the A-CSI priority. For example, the CSI process with a small A-CSI subset index is prioritized. All A-CSI subsets belonging to the CGs may be ordered together, so as to distinguishing between priorities according to the A-CSI subset indices. It is usually ensured that the CG including the Pcell has a smallest index. Alternatively, the A-CSI subset indices may be defined in each CG, thus, the A-CSI subset indices of the A-CSI subsets belonging to multiple CGs may be same.

In order to ensure downlink transmission performance of the CC used to carry the UCI, a priority order may be defined as follows. A priority of the Pcell is higher than a priority of a PScell, and the priority of the PScell is higher than a priority of a Scell except the PScell. If there are multiple PScells, priorities of the PScells may be same. If there are multiple SCells except the PScell, priorities of the SCells may be same. Alternatively, if there are multiple PScells, the PScells may be further ordered according to indices of the PScells; if there are multiple SCells except the PScell, priorities of the SCells may be ordered according to indices of the SCells.

A licensed spectrum or a unlicensed spectrum to which a cell belongs may be taken as a rule. For example, a priority of a cell in the licensed spectrum is higher than a priority of a cell in the unlicensed spectrum. That is because it is ensured that CSI measurement of the cell in the licensed spectrum is valid, but for the cell in the unlicensed spectrum, even though the A-CSI report is triggered, if there is no channel occupied by the cell for a long time period, the A-CSI validity is bad. Alternatively, it may be defined that the priority of the cell in the unlicensed spectrum is higher than the priority of the cell in the licensed spectrum. That is because if the CSI report of the unlicensed spectrum is not timely reported and used, the base station may not have the available A-CSI report for a long time period, while the CSI report of the licensed spectrum may be frequently reported, i.e., there are more opportunities for the CSI report of the licensed spectrum.

According to the method above, when the number of the CSI processes of the triggered A-CSI in the multiple CGs is more than K, the UE determines to update the CSI corresponding to K CSI processes. Since the priority rule is used on both the base station and UE, there is no uncertainty, and the UE may transmit the A-CSI only corresponding to the K CSI processes, i.e., for an A-CSI report corresponding to a CG, only the CSI of CSI processes in the K CSI processes with highest K priorities is remained may be remained, the total number of the A-CSI bits is determined according to the remained CSI, and the A-CSI report is transmitted on the uplink channel corresponding to the A-CSI report of the CG. According to this method, since invalid bits corresponding to the A-CSI not updated are removed, the impact for the uplink data transmission is decreased, and uplink resource utilization rate is improved.

Multiple parameters of processing A-CSI priorities are described above. An actual priority rule may use one parameter in the multiple parameters, or may jointly use multiple parameters in the multiple parameters. For example, four parameters are used, and priorities of the four parameters may be ordered from highest to lowest priority as follows, i.e., a priority of the CSI report type is higher than a priority of the CSI process ID, the priority of the CSI process ID is higher than a priority of the cell ID, the priority of the cell ID is higher than a priority of the CSI subframe set index. In a condition of jointly using some parameters, only when a parameter with a higher priority cannot determine the priority, a parameter with a low priority is further used for comparison.

According to various embodiments of the present disclosure, the A-CSI transmitting method is implemented as described above. Further, an A-CSI transmitting apparatus is provided according to embodiments of the present disclosure.

Figure 6:
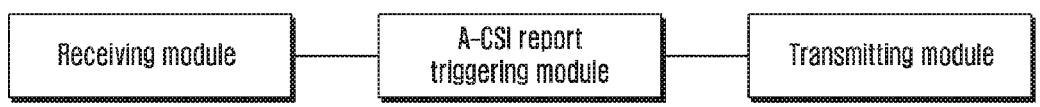
FIG. 6 is a schematic diagram illustrating a structure of an A-CSI transmitting apparatus according to various embodiments of the present disclosure.

FIG. 6 is a schematic diagram illustrating a basic structure of the apparatus according to various embodiments of the present disclosure.

Referring to FIG. 6, the apparatus includes a receiving module in a transceiver, an A-CSI report triggering module in a processor, and a transmitting module in the transceiver.

The receiving module is to receive an uplink grant signaling. The A-CSI report triggering module is to determine whether an A-CSI report is triggered according to a CSI request field in the uplink grant signaling. The transmitting module is to after determining the A-CSI report is triggered, determine a CSI process to be updated, and transmit A-CSI on the uplink CC carrying the A-CSI report.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method by a user equipment (UE), the method comprising:
   receiving a configuration signal;
   receiving a downlink grant signal and downlink data corresponding to the downlink grant signal;
   generating a hybrid automatic repeat request ACK (HARQ-ACK);
   identifying whether a total number of bits of uplink control information including the HARQ-ACK is more than 22;
   if the total number of bits of the uplink control information is more than 22, identifying a first candidate physical uplink control channel (PUCCH) resources set corresponding to a first predetermined PUCCH format, based on the configuration signal;
   if the total number of bits of the uplink control information is not more than 22, identifying a second candidate physical uplink control channel (PUCCH) resources set corresponding to a second predetermined PUCCH format, based on the configuration signal;
   determining PUCCH resources among the identified first or second candidate PUCCH resources set, based on a value in a transmission power control (TPC) field in the downlink grant signal; and
   transmitting the uplink control information on the determined PUCCH resources.

2. The method of claim 1, wherein the uplink control information further includes a scheduling request and a periodic channel state information (CSI) report.

3. The method of claim 1, further comprising:
   if no PUCCH resources is determined for transmitting the uplink control information based on the value in the TPC field, identifying resources configured for transmitting a periodic CSI report; and
   transmitting the uplink control information including the periodic CSI report using the resources.

4. The method of claim 3, further comprising:
   receiving a higher layer signal to configure the resources on which the periodic CSI report is transmitted.

5. An apparatus, comprising:
   a transceiver; and
   at least one processor configured to:
   receive a configuration signal,
   receive a downlink grant signal and downlink data corresponding to the downlink grant signal,
   generate a hybrid automatic repeat request ACK (HARQ-ACK), identify whether a total number of bits of uplink control information including the HARQ-ACK is more than 22,
   if the total number of bits of the uplink control information is more than 22, identify a first candidate physical uplink control channel (PUCCH) resources set corresponding to a first predetermined PUCCH format, based on the configuration signal,
   if the total number of bits of the uplink control information is not more than 22, identify a second candidate physical uplink control channel (PUCCH) resources set corresponding to a second predetermined PUCCH format, based on the configuration signal,
   determine PUCCH resources among the identified first or second candidate PUCCH resources set based on a value in a transmission power control (TPC) field in the downlink grant signal,
   transmit the uplink control information on the determined PUCCH resources.

6. The apparatus of claim 5, wherein the uplink control information further includes a scheduling request and a periodic channel state information (CSI) report.

7. The apparatus of claim 5, wherein the at least one processor is further configured to:
   if no PUCCH resources is determined for transmitting the uplink control information based on the value in the TPC field, identify resources configured for transmitting a periodic CSI report; and
   transmit the uplink control information including the periodic CSI report using the resources.

8. The apparatus of claim 7, wherein the at least one processor is further configured to: receive a higher layer signal to configure the resources on which the periodic CSI report is transmitted.

* * * * *